Dec. 4, 1962   J. A. DRAXLER   3,066,807
INDUSTRIAL TRUCK

Filed April 19, 1961   2 Sheets-Sheet 1

INVENTOR.
JOHN A. DRAXLER
BY Williams, Tilbury & Golrick
ATTORNEYS

Dec. 4, 1962 J. A. DRAXLER 3,066,807
INDUSTRIAL TRUCK
Filed April 19, 1961 2 Sheets-Sheet 2

INVENTOR.
JOHN A. DRAXLER
BY *Williams, Tilbury & Gobrick*
ATTORNEYS

United States Patent Office 3,066,807
Patented Dec. 4, 1962

3,066,807
INDUSTRIAL TRUCK
John A. Draxler, Berea, Ohio, assignor to The Elwell-Parker Electric Company, Cleveland, Ohio, a corporation of Ohio
Filed Apr. 19, 1961, Ser. No. 104,137
7 Claims. (Cl. 214—2)

The present invention is concerned generally with an industrial truck, and more particularly with an industrial truck including a load engaging device, and means for weighing a load supported or carried by said means.

The present invention contemplates the provision of an industrial truck having a load engaging or manipulating device and including a relatively simple, rugged and reliable means for weighing a load carried or engaged thereby. As will be more particularly described hereinafter, between the load engaging device and the truck there is interposed a pair of vertically spaced horizontal parallel flexing plate assemblies permitting a certain slight vertical downward displacement of the load engaging device relative to the truck and also a load cell or weight sensing cell appropriately connected to a calibrated suitable indicating means from which may be read the load applied to the load mechanism.

Moreover a preferred and advantageous form of flex plate assembly is disclosed with a particular mutual relation therebetween which, first, in each of the upper and lower assemblies utilizes rather than a single flexing plate a set of thin plates allowing addition or subtraction of such plates in each assembly thereby to vary the sensitivity of the entire combination; and, secondly, which so disposes the plate or plates in each assembly that in overall condition, i.e., over their major effective length, the plates except in the most extreme and unusual circumstances of use or abuse of the truck are always under tension thereby avoiding the untoward consequences of buckling which might arise were the plates to be put into compression across their width.

In addition to the invention as thus broadly discussed, there is further disclosed a particularly advantageous combination or environment of the broadly conceived invention, of an industrial truck having a vertically movable elevator carriage as the portion of the truck to which the load manipulating mechanism is mounted mounted through the flexing plates; said load manipulating mechanism including means for shifting the load transversely of the truck, means for rotating the load relative to an axis of rotation directed normally centrally longitudinally of the truck, and means for immediately engaging the load such as fork elements or the like.

The aforesaid combination has been determined to be particularly advantageous and useful for example in such applications as the handling of crucibles or pots of molten metal, in tapping a furnace or pouring from the pot certain specified amounts of metal; as from successive melting or refining furnaces or the like, or conversely in pouring out weighed amounts of metal from the pot engaged by the device.

Rotatability of the manipulating mechanism of course permits tilting of the crucible or pot in pouring; horizontal shiftability of the mechanism permits more precise location of the pot to the pouring stream without necessity of shifting the entire truck to bring the pot to position for convenient reception of metal tapped from a furnace; while the vertical elevatability provided by the carriage provides for convenient vertical positioning of the pot in either accepting or discharging metal. Although described in terms of the utility and advantages in handling and weighing molten metal, it is of course to be understood that the arrangement is susceptible of other useful applications.

Further it should be noted that in the specific and more detailed combination just described, the disclosed particular form of flexing plates are especially advantageous in avoiding any situations where buckling might occur and thereby impair accuracy; and further in conducing to the general overall accuracy of the weighing system despite the diverse form of load motion or shiftability or positioning which will be entailed.

A general object of the present invention is then to provide in an industrial truck a load sensing cell operatively interposed between a load engaging device and the truck as a reaction basis, which combination is adapted to actuate a load indicator; and in combination therewith means including flexure plate means mounting the load engaging device to the truck in a deflectable manner which will permit actuation of the load cell.

Another object of the present invention is to provide the combination in an industrial truck having a vertically elevatable or movable carriage, of a load engaging mechanism which may be also rotatable and/or transversely shiftable, with a load sensing cell operatively disposed between said mechanism and carriage and adapted to actuation of a load indicating device; said combination including flexing plate assemblies mounting the mechanism to the carriage in a manner permitting application of vertical forces developed by a load on the mechanism to the load sensing cell.

A further object is the provision in the environment described of flexure assemblies, which by the nature of the individual assemblies and their mutual relation and disposition ensure against the development of damaging buckling forces parallel to the flexing plate elements. A still further object is the provision in the environment described of flexing plate assemblies each having a plurality of thin plates which provide for load sensitivity adjustment by addition or removal of the individual elements.

Another object of the invention is the provision in the combination of a load engaging and manipulating device with an industrial truck of a weighing system or structure permitting of satisfactory accuracy despite relative shifting of the load with respect to the truck.

Other objects and advantages of the present invention will appear from the following description and the drawings wherein.

Figure 1:
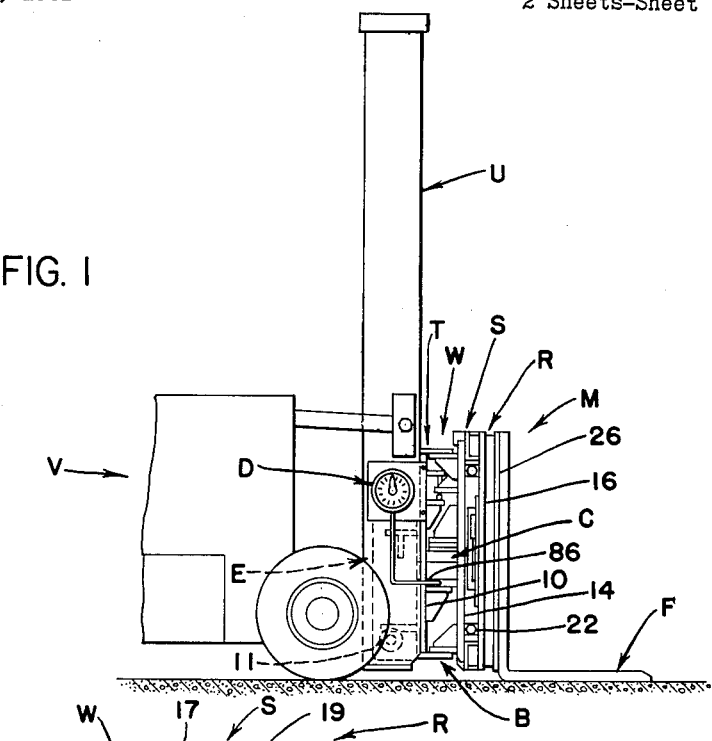
FIG. 1 is a fragmentary side elevation taken at the front part of an industrial truck showing the general relative positions of load engaging means, weighing mechanism, and the immediately adjacent and supporting portions of the truck.

In FIG. 1 there is shown in fragmentary fashion the front part of an industrial truck embodying the present invention showing an elevator carriage E vertically movable in an elevator frame U mounted on the front portion or end of a truck chassis V; a load engaging mechanism M; and a weighing system indicated by the general reference character W including top and bottom flexing plate assemblies T, B, mounting the mechanism M to the carriage E, a load cell C operatively interposed between the mechanism M and the carriage to receive and sense load engendered forces, and the indicating dial or panel D actuated by the load cell to indicate on a calibrated dial the load applied to the mechanism.

The mechanism M in addition to load engaging means or members such as forwardly projecting fork tines F, here is also shown as including fork or load rotating mechanism R and a transverse load shifting mechanism S. Details of mechanism for raising and lowering the carriage E in the elevator frame end of the vehicular portion or chassis of the truck proper are not per se a part of the present invention; and since many suitable and various forms therefor are well known to the prior art, no details are here shown. Also it should be noted that the indicator dial D of the weighing system is here represented as being mounted on a portion of the elevator carriage at one side of the truck to move therewith, but it could as well be affixed to a stationary portion of the truck chassis such as the vertical uprights U of the elevator frame.

The elevator carriage E includes a vertical transverse front plate 10 in front of and extending laterally beyond the upright frame U, and is supported and guided in the elevator frame at each side by vertically spaced pairs of lower rolls 11 and upper rolls 12 rotatably mounted on respective carriage frame side plates secured to the back face of the plate 10. Extending parallel to and forwardly spaced from the front plate of the carriage and mounted thereto by the top and bottom flexure plate assemblies T, B respectively, is a main base plate 14 of the load manipulating and engaging mechanism M.

The transverse shifting mechanism S includes a plate 16 mounted in forwardly spaced parallel transversely slidable relation to plate 14 by top and bottom transverse elements 17, 18 bolted respectively to top and bottom transverse spacing elements or spacers 19, 20 secured to the back face of plate 16, the said elements embracing or engaging the top and bottom edges of the transverse plate 14 and forming in effect slideways therefor. As transverse shift actuators or motors, transversely extending and acting top and bottom double acting hydraulic cylinder units 21, 22 are operatively secured between plates 14 and 16 as by pivot pins engaged in U-shaped brackets or hinge blocks 24 secured on respective plates.

A base plate 26, on the forward plate face of which is directly mounted the immediate load engaging elements such as spaced fork elements F, is mounted in forwardly parallel spaced rotatable relation to the plate 16 through the known interposed circular bearing structure 27 comprising an outer race 28 secured to the forward face of plate 16, an inner race 29 secured to the back face of plate 26 and the bearing balls 30 circumferentially filling the space defined by roughly shallow V-shaped circumferential grooves formed internally and externally on 28 and 29 respectively. The internal circumference of the inner race 29 is provided with an internal ring gear formation 31 meshed with an output driving pinion 32a of the rotating mechanism drive motor 32. The motor 32 may be an electric or hydraulic motor as may be desired in the environment of a particular truck. The energy or fluid supply lines and controls for the transverse shift motors and the rotary motor are not here shown since per se no part of the invention and many and various forms are known to the prior and patented art.

The structure of the flexing plate or flexure assemblies is now described with reference to FIGS. 3, 4 and 5 for the upper flexure T. The assembly T comprises a pair of spaced parallel mounting plates 40, 41 connected by three sets 42, 43, 44 of flexing plates proper (see FIG. 3); the end sets 42, 44 being of like configuration and in total length shorter than the intervening or central set 43. The top plate 40 is secured for a longitudinally spaced series of cap screws 45 along its rear edge or margin to the top edge of the plate 10 to project forwardly thereform; while the plate 41 is secured on the back face of plate 14 to extend rearwardly therefrom in underlying relation to plate 40; here being shown secured by welding with longitudinally spaced bracket plates 47 being used to further rigidity. Obviously, plate 41 could be one side of an angle iron having its other side or leg bolted to the back face of plate 14.

Figure 3:
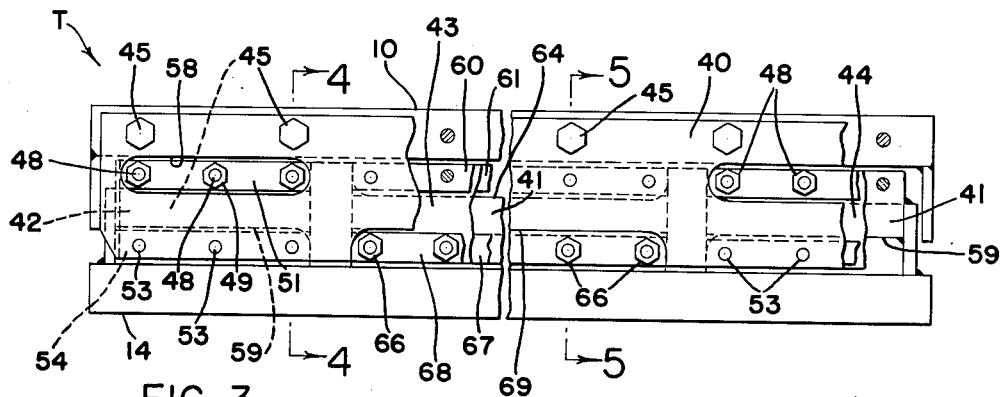
FIG. 3 is a plan view of the upper flexing plate assembly.
Figure 4:
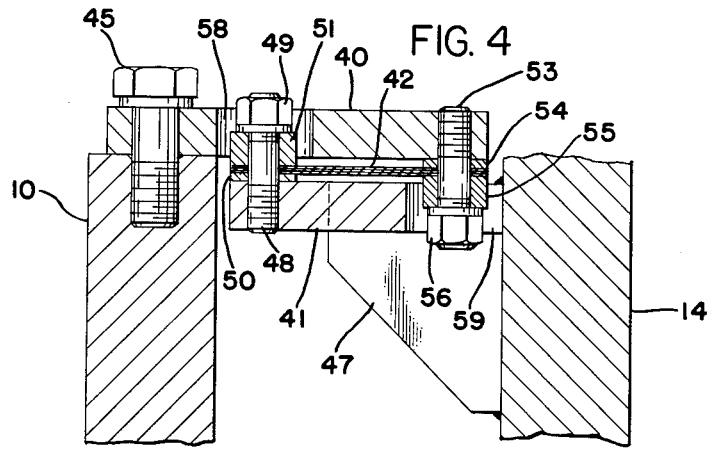
FIG. 4 is a section taken as indicated by the line 4—4 in FIG. 3.
Figure 5:
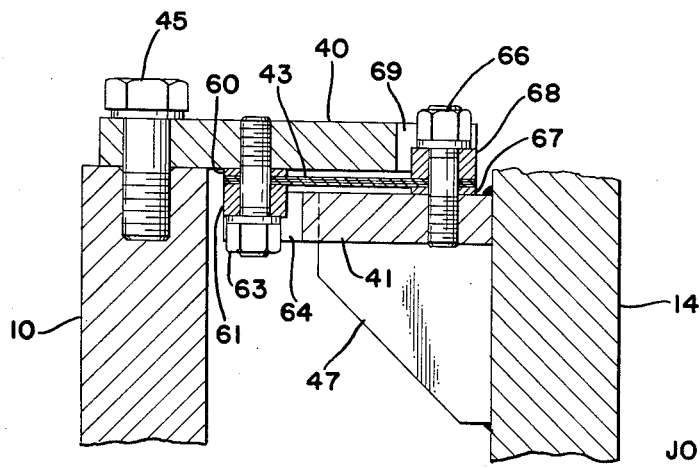
FIG. 5 is a section taken as generally indicated by the line 5—5 in FIG. 3.

The relation of the flexing plate set 42 to plates 40 and 41 (set 44 being similarly arranged and disposed at the other end) appears from FIGS. 3 and 4. Here are shown three relatively thin plates comprising the set 42, along the back margin thereof secured to the back region of plate 41 by three studs 48 with respective lock washers and nuts 49 between a thin relatively narrow spacer plate 50 and an upper thicker clamping plate 51. By a similar arrangement of three downwardly projecting studs 53, the front marginal region of the set 42 is secured between a thin spacer 54 and a clamping plate 55 by respective nuts and lock washers 56. Elongated slots 58, 59 are provided in the outside and inside plates to accommodate the studs and clamping plate of each other.

On the other hand, the longer intermediate plate assembly 43 (see particularly FIG. 5) along its back margin is clamped or secured to the underside of plate 40 just forward of plate 10 between a spacer strip 60 and clamping block 61 by a longitudinally spaced series of studs with nuts and lock washers indicated by the general reference 63; the back edge of the plate 41 here having an elongated slot or recess 64 to accommodate the same. The front edge of the plate set 43 is clamped to the top of plate 41 just behind plate 40 again by a like arrangement of studs, nuts and lock washers indicated by the general reference numeral 66 between thin spacer plate 67 and clamp block 68 with the forward edge of the plate 40; in this region being provided an elongated recess or slot 69 to accommodate the same.

Preferably the apertures in the plates of the sets 42, 43 and 44 are carefully drilled and reamed for a close fit with the shanks of the respective studs.

With the arrangement here shown and described the plate set 43, preferably of somewhat greater length than the sum of the lengths of 42 and 44, is under tension as a result of the weight of the load manipulating mechanism and any load engaged therewith; while the shorter sets are of course in compression when considering the forces acting parallel to the plate set in a fore-and-aft direction.

Figure 2:
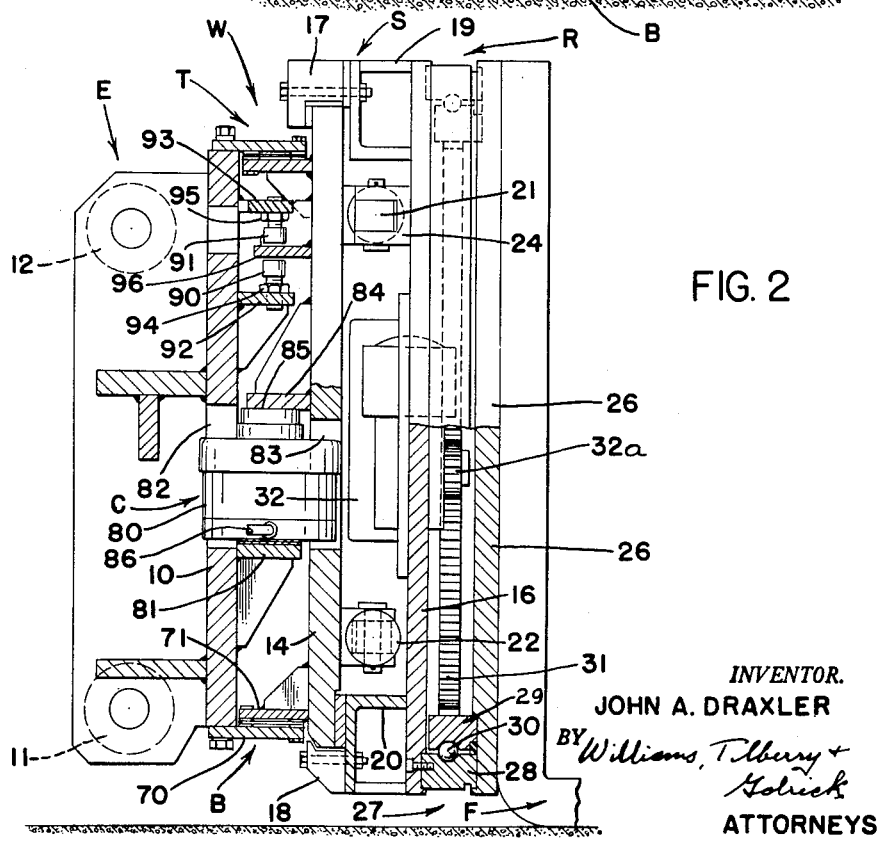
FIG. 2 is a detail view in fragmentary generally vertical longitudinal section, of the truck elevator carriage, the load engaging mechanism, and the interposed flexing plate assemblies and load cell.

In the lower flexing plate assembly B on the other hand, the connections of the shorter end sets and the intermediate set relative to the outer and inner plates 70, 71 mounted on the bottom edge of plate 10 and along the lower back face margin of plate 14 in an analagous manner to that described for the top plate set or assembly T, have reversed connections, again using spacer plates, clamp plates and stud and nut connections as previously described. In other words, by reversed connections it is meant that for the intermediate or central plate set in the bottom assembly B the relation of the inside and outside mounting plates 71, 70 to the flexing plates would be represented by FIG. 4 inverted; while the end assemblies or sets would each be similar in cross section to FIG. 5 inverted; the attachment of plates 70 and 71 to 10 and 14 being of course as shown in FIG. 2. Again the result is that the center or intermediate set of B again would normally be in tension with the end sets in compression.

Here the base 80 of the load cell, such as a hydraulic load cell, is supported at mid-width of the plate 10 on a shelf or bracket structure 81 projecting forwardly of plate 10 with the plates 10 and 14 respectively apertured at 82, 83 to provide clearance relative to the load cell. A horizontal plate structure 84 extending from the rear face of plate 14 and rigidly secured thereto bears upon the top of a movable sensing or piston element 85 of the load cell. The conduit 86 provides a hydraulic connection to the indicating dial gage D previously described. As safety stops there are provided a pair of aligned adjustable screws 90, 91, with centerlines in the vertical longitudinal centerplane of the load cell, adjustably threaded into a pair of spaced parallel rigid lugs or brackets 92, 93 and secured in adjusted spaced relation of their opposed heads by lock or jam nuts 94, 95, between which extend a plate 96 again rigidly secured to and projecting from the back face of plate 14.

In this arrangement the screw 90 provides a safety stop for the load cell by limiting the downward movement of plate 14 relative to 10 upon engagement therewith of plate 96. In a typical arrangement, for example, about 0.015 inch downward movement is permitted from the position of plate 14 under conditions where the load manipulating mechanism has no load. The nut 91 provides a safety stop protecting the flexures against damage upon upward movement of plate 14 relative to 10; as for example might occur where the load manipulating or engaging mechanism encounters some external obstacle during downward movement.

By way of example of suitable devices may be mentioned for the hydraulic load cell a "Type E" cell manufactured by The A. H. Emery Company of New Canaan, Connecticut; and for the weight indicator dial gage the hydraulic pressure indicators of that same company calibrated in terms of weight rather than pressure, the latter being Bourdon tube type gages with externally manually accessible needle zeroing adjustment. However, it should be noted that in the broader aspects of the invention other types of transducer or load sensing elements may be used, with appropriate translating and indicating means, of which a multitude are now known, for example to the presently designated "electronic" arts.

It has been found that in the combination of the disclosed weighing system with typical known industrial truck load manipulating systems, not only an accuracy of ½% can be readily obtained, but also a "sealing" accuracy of ¼% appears to be obtainable with care in the assembly to achieve good centering of the cell relative to the width of plates 10, 14.

I claim:

1. In an industrial truck for engaging and transporting a load, the combination of load engaging means supported by the truck, means for mounting said load engaging means in supported relation to the truck and including flexure means permitting relative vertical movement of the load engaging means relative to the truck, load sensing cell means interposed between the truck and the load engaging means, and indicator means responsive to said sensing cell for indicating the weight of the engaged load; said flexure means comprising an assembly of plates in laminated relation and relatively thin with respect to a longitudinal extent disposed transversely with respect to said truck and to width disposed generally horizontally and lengthwise of the truck; said flexure means being secured along opposed respective longitudinal margins to said truck and said load engaging means to be in an overall normally tensioned condition across the width thereof.

2. The combination of claim 1 wherein said cell is a hydraulic cell and said indicator means is a hydraulic pressure gage connected to the cell and calibrated in terms of weight.

3. The combination as described in claim 1, wherein said flexure means comprises top and bottom flexure assemblies disposed in vertically spaced parallel relation, each assembly including vertically stacked plates in an intermediate group under normal tension, like groups at opposite lateral ends of the intermediate group but normally in compression; the compression groups of each assembly being subjected normally to a net compressive force less than the tensile force to which the corresponding tension group is subjected.

4. The combination of claim 3, wherein said load engaging means includes a portion transversely shiftable relative to the carriage, and means rotationally shiftable relative to the carriage.

5. The combination as described in claim 1, wherein said truck includes an elevator frame on the truck chassis, an elevator carriage vertically movable on the frame, and a load engaging means supported on the carriage and thereby on the truck.

6. The combination as described in claim 5, wherein said load engaging means includes a portion transversely shiftable relative to the carriage, and means rotationally shiftable relative to the carriage.

7. The combination as described in claim 1, wherein said load engaging means includes a portion transversely shiftable relative to the carriage, and means rotationlly shiftable relative to the carriage.

References Cited in the file of this patent

UNITED STATES PATENTS

| | | |
|---|---|---|
| 2,541,268 | Milz | Feb. 13, 1951 |
| 2,822,095 | Buckingham | Feb. 4, 1958 |
| 2,822,101 | Schenkelberger | Feb. 4, 1958 |